United States Patent [19]

Chang

[11] Patent Number: 5,194,308
[45] Date of Patent: Mar. 16, 1993

[54] TILE WITH MULTIPLE LAYERS

[76] Inventor: Che-Yuan Chang, c/o Hung Hsing Patent Service Center, P.O. Box 55-1670, Taipei (10477), Taiwan

[21] Appl. No.: 910,516

[22] Filed: Jul. 8, 1992

[51] Int. Cl.⁵ .............................. B32B 3/00; B32B 3/30
[52] U.S. Cl. .......................................... 428/44; 428/47; 428/48; 428/58; 428/167
[58] Field of Search ................. 428/44, 47, 48, 49, 428/58, 167

[56] References Cited

U.S. PATENT DOCUMENTS

| | | | |
|---|---|---|---|
| 3,014,829 | 12/1961 | Curtin | 428/47 |
| 3,455,076 | 7/1969 | Clarvoe | 428/167 |
| 4,121,008 | 10/1978 | Seddon | 428/319.3 |
| 4,188,428 | 2/1980 | Wolf | 428/167 |

Primary Examiner—William J. Van Balen

[57] ABSTRACT

A tile includes: an outer layer having a decorative surface portion formed on an outermost surface of the outer layer made of rigid material such as rigid plastic material, an air-chamber layer formed on a bottom portion of the outer layer defining an air chamber in the bottom portion of the outer layer, a plurality of supporting stems protruding downwardly or inwardly from the outer layer to be distributed in the air chamber, and a substrate layer secured to each bottom surface of the supporting stem for sealing the air chamber and made of softer material such as soft plastic material to be coated on a floor surface, thereby providing a comfortable cushioning and thermal resistant tile as effected by the intermediate air-chamber layer and the substrate layer.

9 Claims, 3 Drawing Sheets

TILE WITH MULTIPLE LAYERS

BACKGROUND OF THE INVENTION:

A conventional tile such as made of marble stone may be paved on a ground surface. Such a marble-stone tile is too hard and may cause injury to a child or an infant when collapsing or falling down to impact the marble tile. Even the marble tile may give a comfortable cooling feeling for someone treading on the marble tiles in summer season. However, in a cold weather season, the marble tile will cause a dislike cold feeling for the user.

A wooden tile may have its decorative meaning due to the wooden texture on an esthetic point of view. However, when frequently flushing and washing the tiles embedded on a floor by water, the wooden tiles may be corroded or damaged, causing maintenance problem. Meanwhile, the cost for installing the wooden tiles is expensive.

A conventional plastic tile by unrolling a plastic sheet and coating on the floor surface can be provided for substituting the wooden tiles for reducing the installation cost of tiles. However, the plastic sheet coated on the floor surface will become deformed or corrugated after a long time service as subjected to a user's body pressure treading the plastic sheet on the ground surface, influencing an interior decoration.

SUMMARY OF THE INVENTION

The object of the present invention is to provide a multiple-layer tile having a softer intermediate layer for a better cushioning for enhancing a tile safety and preventing impact injury caused especially to an infant.

Another object of the present invention is to provide a thermally insulating tile for minimizing environmental temperature influence such as in a hot or cold weather or season.

Still another object of the present invention is to provide a tile with a low cost, with a decorative surface of wood-texture and with water resistance durable for water washing.

According to the present invention, there is provided a tile including: and outer layer having a decorative surface portion fomed on an outermost surface of the outer layer made of rigid material such as rigid plastic material, an air-chamber layer formed on a bottom portion of the outer layer defining an air chamber in the bottom portion of the outer layer, a plurality of supporting stems protruding downwardly or inwardly from the outer layer to be distributed in the air chamber, and a substrate layer secured to each bottom surface of the supporting stem for sealing the air chamber and made of softer material such as soft plastic material to be coated on a floor surface, thereby providing a comfortable cushioning and thermal resistant tile as effected by the intermediate air-chamber layer and the substrate layer.

DETAILED DESCRIPTION

Figure 1:
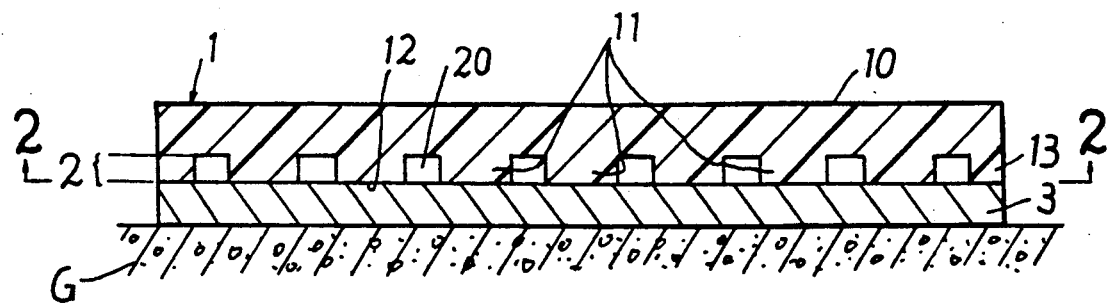
FIG. 1 is a longitudinal sectional drawing of the present invention.
Figure 2:
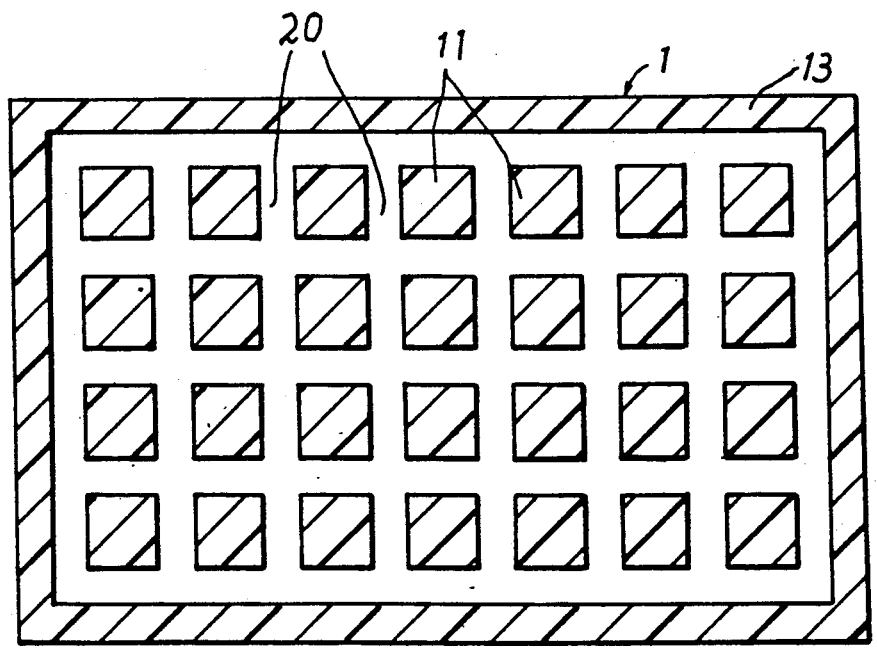
FIG. 2 is a cross sectional drawing of the present invention when viewed from 2—2 direction of FIG. 1.

As shown in FIGS. 1, 2, the present invention comprises: a rigid outer layer 1, an air-chamber layer 2, and a soft substrate layer 3 softer than the outer layer 1 and coated on a ground or a floor surface G.

The rigid outer layer 1 may include a decorative surface portion 10 formed or printed with wooden texture, floral features and other art features.

The rigid outer layer 1 is made of rigid plastic material such as copolymer of acrylic-butadiene-styrene (ABS) having abrasion resistance and durable for heavy weight loaded on the outer layer 1.

A plurality of supporting stems 11 are protruded downwardly or inwardly from a bottom portion of the outer layer 1 to be distributed in the air chamber 20 formed in an intermediate air-chamber layer 2 positioned in a bottom portion of the outer layer 1, having each bottom surface 12 of each supporting stem 11 secured with the substrate layer 3 with adhesive or other joint methods. The substrate layer 3 secured with the stems 11 of the outer layer 1 will seal the air chamber 20.

A side frame portion 13 is circumferentially formed on all side portions of the outer layer 1 confining the supporting stems 11 and the air chamber 20 within the side frame portion 13, with the substrate layer 3 securing a bottom surface of the side frame portion 13 as shown in FIG. 1.

Figure 2A:
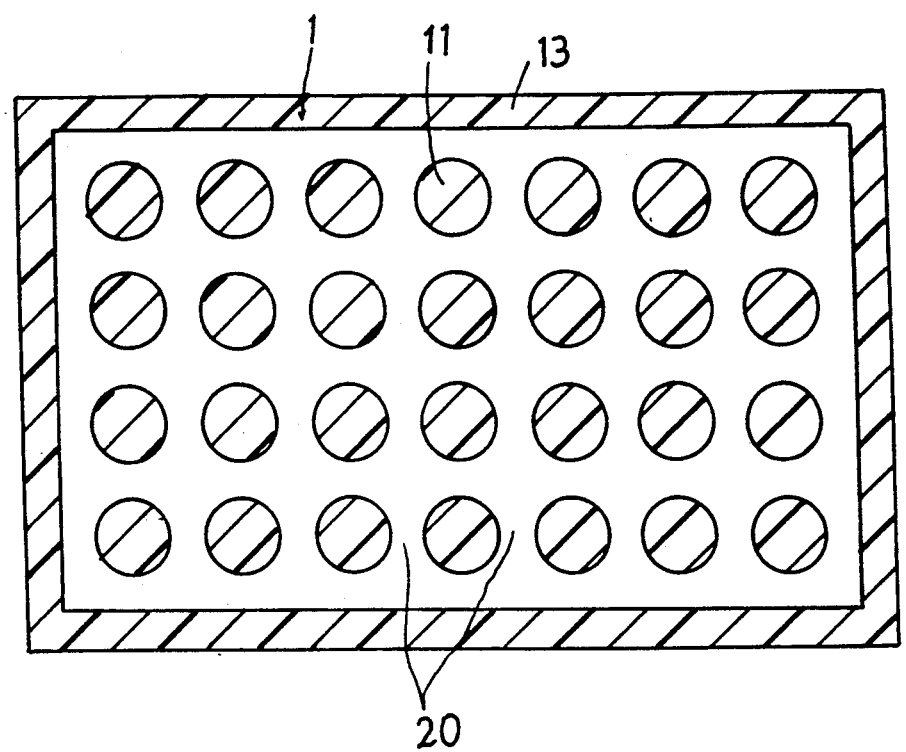
FIG. 2a is a cross sectional drawing of another preferred embodiment of the present invention.

The supporting stem 11 may have a cross section of square shape as shown in FIG. 2 or of round shape as shown in FIG. 2a. But the shapes of the stems 11 are not limited in this invention.

The substrate layer 3 is made of soft elastic plastic material such as polyvinyl chloride (PVC) which may coated on the ground or floor surface.

Figure 4:
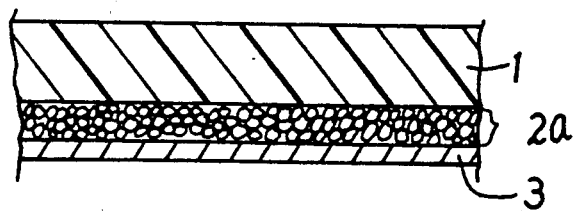
FIG. 4 shows still another preferred embodiment of the present invention.

As shown in FIG. 4, the intermediate air-chamber layer 2 is substituted with an air-cell layer 2a including a foam or porous layer having a plurality of air cells formed therein. The substrate layer 3 is then coated or secured on a bottom portion of the air-cell layer 2a. Naturally, the substrate layer 3 as shown in FIG. 4 may be eliminated and the foam layer 2a may be directly coated on a ground surface.

Figure 3:
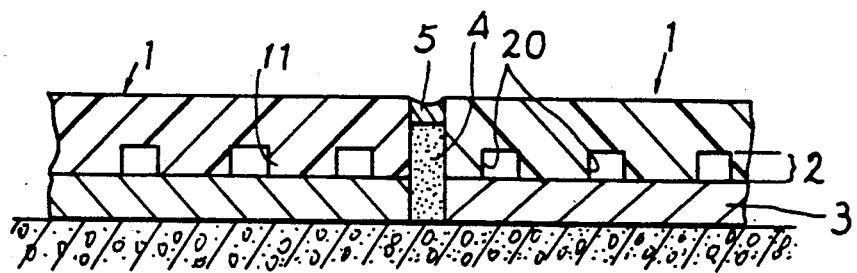
FIG. 3 shows a linking of two adjacent tiles in accordance with the present invention.

As shown in FIG. 3, two neighbouring tiles of the present invention may be bonded with sealant or adhesive 4 between the two tiles and a decorative strap 5 may be coated or paved on the sealant 4 between the two tiles.

The decorative strap 5 may be made of metal foil such as copper or aluminum or other metals.

The present invention has the following advantages:

1. The outer rigid layer 1 is resistant to abrasion and heavy pressure, whereas the middle and substrate layers 2, 3 are soft to thereby render better cushioning effect to prevent impact injury when collapsing.

2. Due to the air chamber 20 layer, it may serve as a well thermally insulating layer so as to preclude a heat or cold attack from an outdoor environmental or weather attack.

3. Due to the air in air-chamber layer 2, it may serve as a buffer for absorbing thermal expansion or contraction due to environmental temperature changes.

4. The cost is cheaper since the materials can be selected from inexpensive plastic materials.

5. If the tile is made of plastic material, it will have the property of corrosion or moisture resistance, convenient for water-washing maintenance for a prolonged service life.

I claim:

1. A tile comprising: a rigid outer layer having a decorative surface portion formed on an outermost surface of the outer layer made of rigid material, an air-chamber layer formed on a bottom portion of the outer layer defining an air chamber in the bottom portion of the outer layer, a plurality of supporting stems protruding inwardly from the outer layer to be distributed in the air chamber, and a soft substrate layer secured to each bottom surface of the supporting stem for sealing the air chamber and made of soft material softer than that of the outer layer and coated on a floor surface, thereby providing a cushioning and thermal resistant tile as effected by the air-chamber layer.

2. A tile according to claim 1, wherein said rigid outer layer includes a decorative surface portion formed with wooden texture, floral features and art features.

3. A tile according to claim 1, wherein said rigid outer layer is made of rigid plastic material having abrasion resistance and durable for heavy weight loaded on the outer layer.

4. A tile according to claim 1, wherein a side frame portion is circumferentially formed on all side portions of the outer layer confining the supporting stems and the air chamber within the side frame portion with the substrate layer securing a bottom surface of the side frame portion.

5. A tile according to claim 1, wherein said substrate layer is made of soft elastic plastic material which is coated on the ground surface.

6. A tile according to claim 1, wherein two neighbouring tiles are bonded with sealant between the two tiles and a decorative strap is coated on the sealant between the two neighbouring tiles.

7. A tile according to claim 6, wherein said decorative strap is made of metal foil.

8. A tile comprising:
   a rigid outer layer made of rigid plastic material;
   an air-cell layer secured on a bottom portion of said outer layer having a plurality of air cells formed in said air-cell layer; and
   a soft substrate layer secured on a bottom portion of said air-cell layer.

9. A tile according to claim 8, wherein said air-cell layer is made of foam material.

* * * * *